US00RE35996E

United States Patent [19]

Rasmussen

[11] E Patent Number: Re. 35,996

[45] Reissued Date of Patent: Dec. 15, 1998

[54] CONTINUOUS DUTY PRESS MONITORING SYSTEM

[76] Inventor: Robert F. Rasmussen, 1094 Dorsh Rd., South Euclid, Ohio 44121-3832

[21] Appl. No.: 907,851

[22] Filed: Aug. 8, 1997

Related U.S. Patent Documents

Reissue of:

[64] Patent No.: 5,440,499
Issued: Aug. 8, 1995
Appl. No.: 19,017
Filed: Feb. 18, 1993

[51] Int. Cl.[6] ..... G01B 7/16

[52] U.S. Cl. ..... 702/43; 702/105; 73/1.79; 73/862.625; 73/862.542; 324/207.18; 340/870.36; 340/6.79

[58] Field of Search ..... 364/551.01, 551.02, 364/508, 472.06, 476.01; 73/1.79, 862.625, 862.542, 767, 768, 779, 855; 100/99; 324/207.11, 207.15, 207.17, 207.18; 340/870.35, 870.36, 665, 679, 680; 83/72, 859

[56] References Cited

U.S. PATENT DOCUMENTS

| | | | |
|---|---|---|---|
| 3,948,088 | 4/1976 | Shepherd | 73/779 |
| 4,195,563 | 4/1980 | Budraitis et al. | 100/99 |
| 4,274,282 | 6/1981 | Budraitis et al. | 73/862.64 |
| 4,305,299 | 12/1981 | Serata | 73/779 |
| 4,312,241 | 1/1982 | Budraitis et al. | 73/862.35 |
| 4,335,439 | 6/1982 | St. Denis | 364/472 X |
| 4,493,362 | 1/1985 | Moore et al. | 164/457 |
| 4,554,534 | 11/1985 | Jones | 340/665 |
| 4,633,720 | 1/1987 | Dybel et al. | 364/506 X |
| 4,671,124 | 6/1987 | Seliga | 73/862.53 |
| 4,750,131 | 6/1988 | Martinez | 364/476 |
| 4,766,758 | 8/1988 | Lucas et al. | 73/1 B |
| 4,866,429 | 9/1989 | Granere | 340/680 |
| 5,066,911 | 11/1991 | Hulsing, II | 324/207.18 |
| 5,119,311 | 6/1992 | Gold et al. | 364/476 |
| 5,142,769 | 9/1992 | Gold et al. | 29/621.1 |

*Primary Examiner*—Eric W. Stamber
*Attorney, Agent, or Firm*—Benesch, Friedlander, Coplan & Aronoff LLP

[57] ABSTRACT

A continuous duty press monitoring system includes a linear variable displacement transducer mounted to a press frame as to acquire data related to stresses and strains in the press housing due to completion of a press operation. First and second oppose, spaced apart ends of a rod member are secured to the press housing or frame. The first send is secured to so as to cause axial movement of the rod in accordance with the frame movement at that point. The second portion is secured to the housing so as to allow the second end to be slidable in relation thereto. A linear variable displacement transducer is secured at the slidably affixed end of the rod. A magnetic flux generated by application of current to a coil of the transducer is affected by relative positioning of the rod thereto. Press operation thereby provides an indication, due to stresses or strains resultant on the press housing, as to the characteristics of a particular press operation. Flux variations provide an analog signal representative of these press characteristics. This analog signal is communicated to a continuous plotter, a digitized version of which is further communicated to a microprocessor controller. An alarm is advantageously generated when preselected characteristics have been exceeded by press operation.

40 Claims, 5 Drawing Sheets

CONTINUOUS DUTY PRESS MONITORING SYSTEM

Matter enclosed in heavy brackets [ ] appears in the original patent but forms no part of this reissue specification; matter printed in italics indicates the additions made by reissue.

*This application is a Reissue of Ser. No. 08/019,017 filed Feb. 18, 1993 now U.S. Pat. No. 5,440,499.*

BACKGROUND OF THE INVENTION

This application pertains to the art of press fabrication and more particularly to control of a pressing operation or run. The invention is particularly applicable to continuous, real-time monitoring of press operation and will be described with particular reference thereto. However, it will be appreciated that the invention has broader applications such as in any system in which stress or strain characteristics are advantageously measured or monitored continuously, accurately, and in real time.

A substantial number of manufactures are formed through punching or press operations. In such an operation, raw material, such as steel or other malleable metal is subjected to a high-force blow from a die. Application of insufficient force will result in underformed or malformed workpieces. Excessive force may damage the workpiece or the press itself. Further, excessive force may be indicative that the press is being operated at too high a level. That is, the particular press operation may be more suitable for a press of higher capacity or force.

Some earlier systems have attempted to address these concerns by utilization of press housing strain characteristics to determine force of a particular press blow. A mechanical strain gauge was affixed to a press housing. The strain gauge would be manually reset and a reading obtained after a single blow of a press operation. The strain gauge reading obtained from this blow would be utilized to determine whether the press was utilized beyond capacity during setup of a run. Typically, several sample workpieces would be so measured, with a manual reset of the strain gauge between each workpiece.

These systems provide useful information during the set up operation of a particular workpiece run. However, the mechanical nature of the strain gauge is utilized and the manual reset requirements limited its utility to such set ups.

The present invention contemplates a new and improved press monitor which provides not only intermittent or set-up press characteristics, that provides continuous, real-time and non-supervised monitoring and control of a press operation.

SUMMARY OF THE INVENTION

In accordance with the subject invention, there is provided a linear variable displacement transducer which includes a coil portion movably connected to a core portion such that the magnetic flux generated by current impressed on the coil is influenced by a position of the core relative thereto. A securing means is provided for securing the core portion and the coil portion to spaced apart portions of a housing of an associated press. This is accomplished such that compression and expansion of the housing will influence a relative position of the core to the coil. An alternating current is impressed on the coil and variations in the resultant magnetic flux, due to the relative position of the core, is monitored. A signal is generated representative of this relative position.

In accordance with a more limited aspect of the present invention, the signal is digitized and filtered to provide a press deflection system which bears information on the force being imparted to a workpiece in the press.

In accordance with a more limited aspect of the present invention, a means is provided for archiving or generating a printout of press characteristics.

In accordance with another aspect of the present invention, a method for completing a series of press operations with continuous characteristic monitoring with the above structure is provided.

In accordance with yet another aspect of the present invention, a system is provided for automatically zeroing the same to achieve a consistent minimum output when a press is unloaded.

An advantage of the present invention is the provision of a press monitoring system adapted for continuous, uninterrupted and unsupervised duty.

Another advantage of the present invention is the provision of a system which allows for building a record of press characteristics associated with each workpiece fabricated therefrom.

Yet another advantage of the present invention is the provision of a system by which compressed characteristics may be compared to preselected standards to determine acceptability thereof.

Further advantages will become apparent to one of ordinary skill in the art upon a reading and understanding of the subject specification.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein.

DETAILED DESCRIPTION OF THE PREFERRED EMBODIMENT

Figure 1:
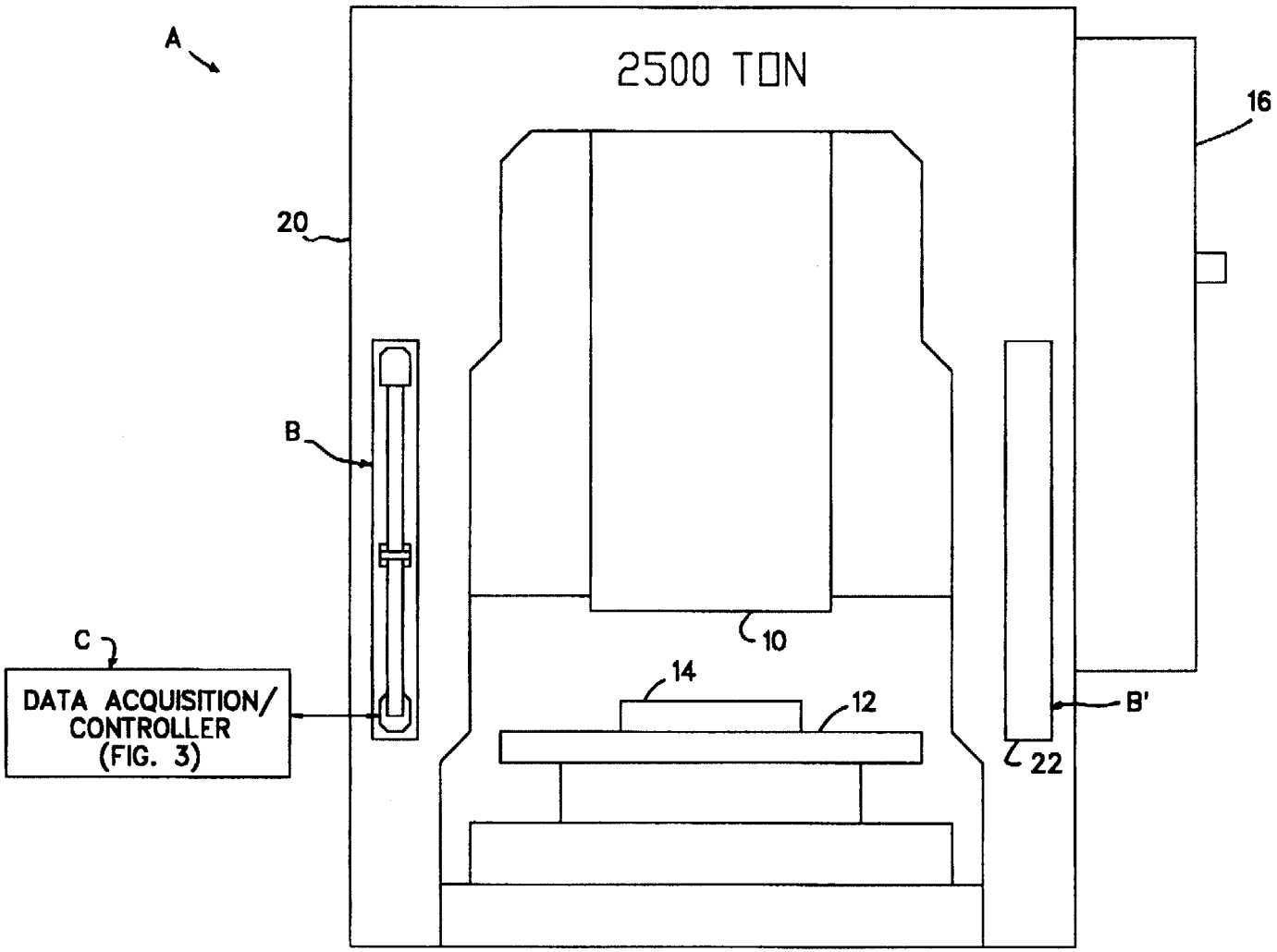
FIG. 1 illustrates a press machine and monitor/controller in accordance with the present invention.

Turning now to the illustrations wherein the showings are for the purpose of illustrating the preferred embodiment only, and not for the purpose of limiting the same, FIG. 1 illustrates a press A, a linear variable displacer transducer ("LVDT") mechanism B, and a data acquisition/controller unit C.

The press A is suitably comprised of any, conventional press mechanism. Such a mechanism includes a ram 10 disposed adjacent to a platen 12. As will be understood, typical workpiece formation, such as in a formation of a workpiece 14, is accomplished by provision of a die or tooling in at least one of ram 10 and platen 12. The press A is illustrated as a motor-driven system employing a motor/gear arrangement 16 to drive the ram 10. However, it will be appreciated that any ram, such as a hydraulically driven ram, may suitably be utilized in connection with the subject system.

The ram A includes a frame or housing portion 20 which links the ram 10 with the platen 12. It will be appreciated that operation of the press results in an induced stress or strain on the frame 20.

The LVDT mechanism B is secured to the frame 20 in a fashion to be detailed below. Stresses and strains within the frame 20, induced by operation of the press A, are measured by the mechanism B. These signals are, in turn, communicated to the data acquisition/controller unit C which will also be detailed below.

Also illustrated is a second LVDT B' which is shown as encased in a metallic housing 22. Such a second LVDT may be utilized for complimentary data acquisition or redundancy, and is interfaced to either the data acquisition/controller C, or to a secondary, similar unit C' (not shown). The LVDT B is, in the preferred embodiment, also encased in housing to similarly isolate it from debris and particulate matter, although it is not shown for illustrative purposes.

Figure 2A:
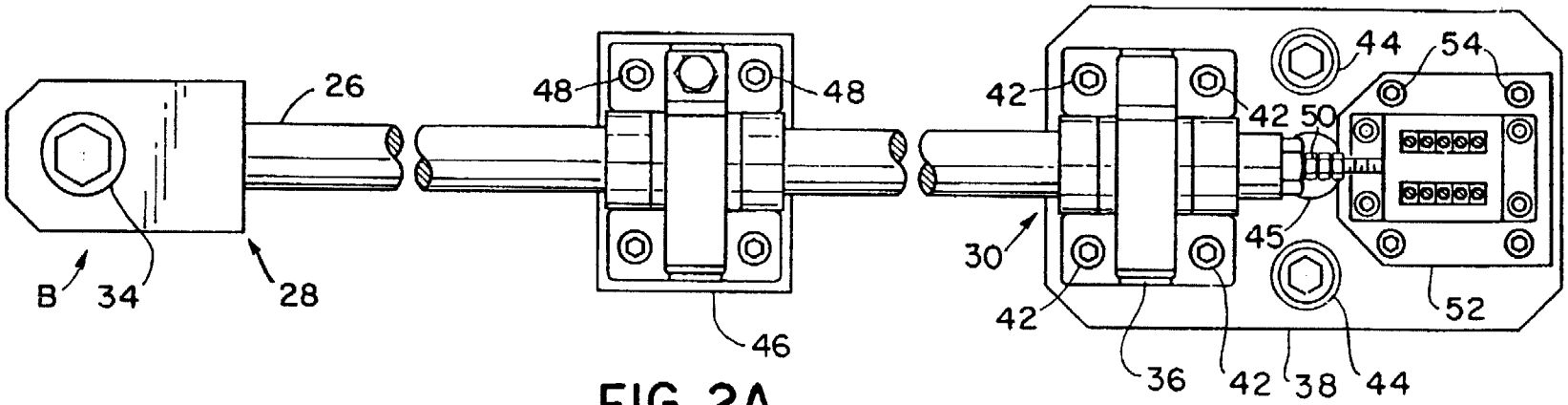
FIGS. 2A and 2B illustrate a top and side view of the transducer array as utilized in connection with the monitor of FIG. 1.
Figure 2B:
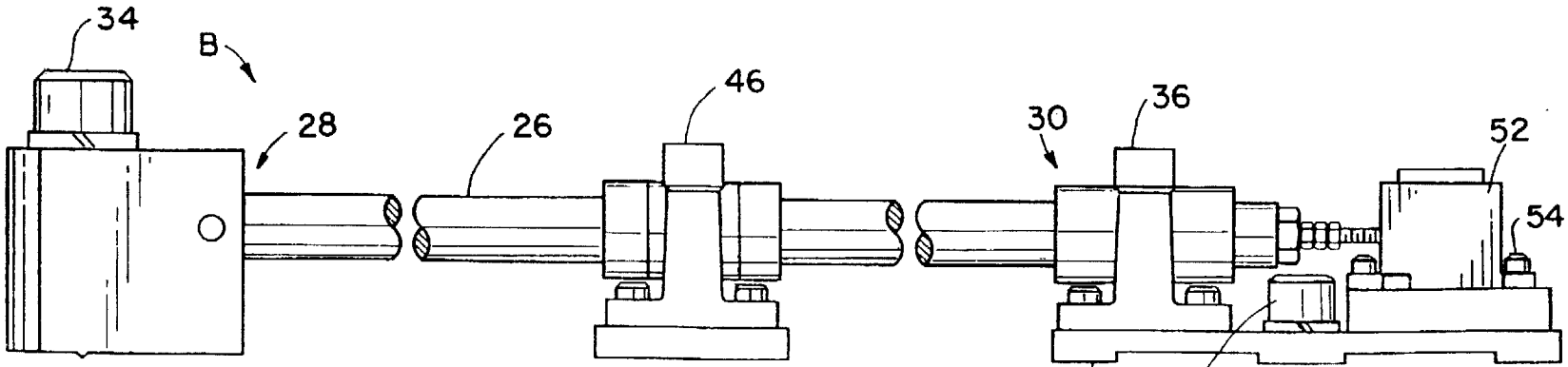

FIGS. 2A and 2B illustrate, in detail, a preferred fabrication of the LVDT mechanism B. FIG. 2A illustrated a top view while FIG. 2B illustrates a side view. In the LVDT mechanism, a rod member 26 includes opposed, first and second spaced-apart ends 28 and 30. The elongated rod 26 is suitably formed of a relatively inflexible material, such as hardened steel. First end 28 is secured to the frame 20 (FIG. 1) with a fastener such as illustrated by bolt 34. The fastener or bolt 34 functions to secure the first end to the frame so as to allow axial displacement of the rod 26 corresponding to frame movement at a first mounting point, defined as that accomplished with fastener 34.

The second end 30 is slidably received into a support member 36 which allows axial movement of the rod 26 with respect thereto. The support member 36 is, in turn, originally secured to a base plate 38 via fasteners 42. Similarly, the base plate 38 is affixed to the frame 20 (FIG. 1) via fasteners 44 and further secured by a dowel pin 45.

The system advantageously employs an intermediate support member 46 disposed between the first and second space apart ends 28, 30. Support member 46 is second to the frame 20 with fasteners 48. Like the support member 36, the member 46 allows axial movement of the rod 26 with respect thereto.

With the afore-described arrangement, it will be appreciated that stresses and strains of the frame are measured by a relative position of second end 30 relative to each portion of the base plate 38. While such stresses and strains are relatively small, they are exaggerated proportionally to the distance between ends 28 and 30 which is determined by the length of the rod 26. A bolt mechanism 50 is secured coaxially to the rod 26 at an extreme of second spaced apart ends 30. This bolt is, in turn, connected to a movable portion of a linear variable displacement transducer 52. A suitable LVDT is manufactured by Lucas Schaevitz of Pennsauken, N.J. The LVDT 52 employs a coil mechanism, movable relative to a core mechanism. Accordingly, magnetic flux induced in the coil is affected by the relative position of the core thereto. With this arrangement, the LVDT 52 which is secured to the base plate 38 by fasteners 54, is adapted for generating a signal relative to longitudinal stresses and strains on the frame 20.

Figure 3:
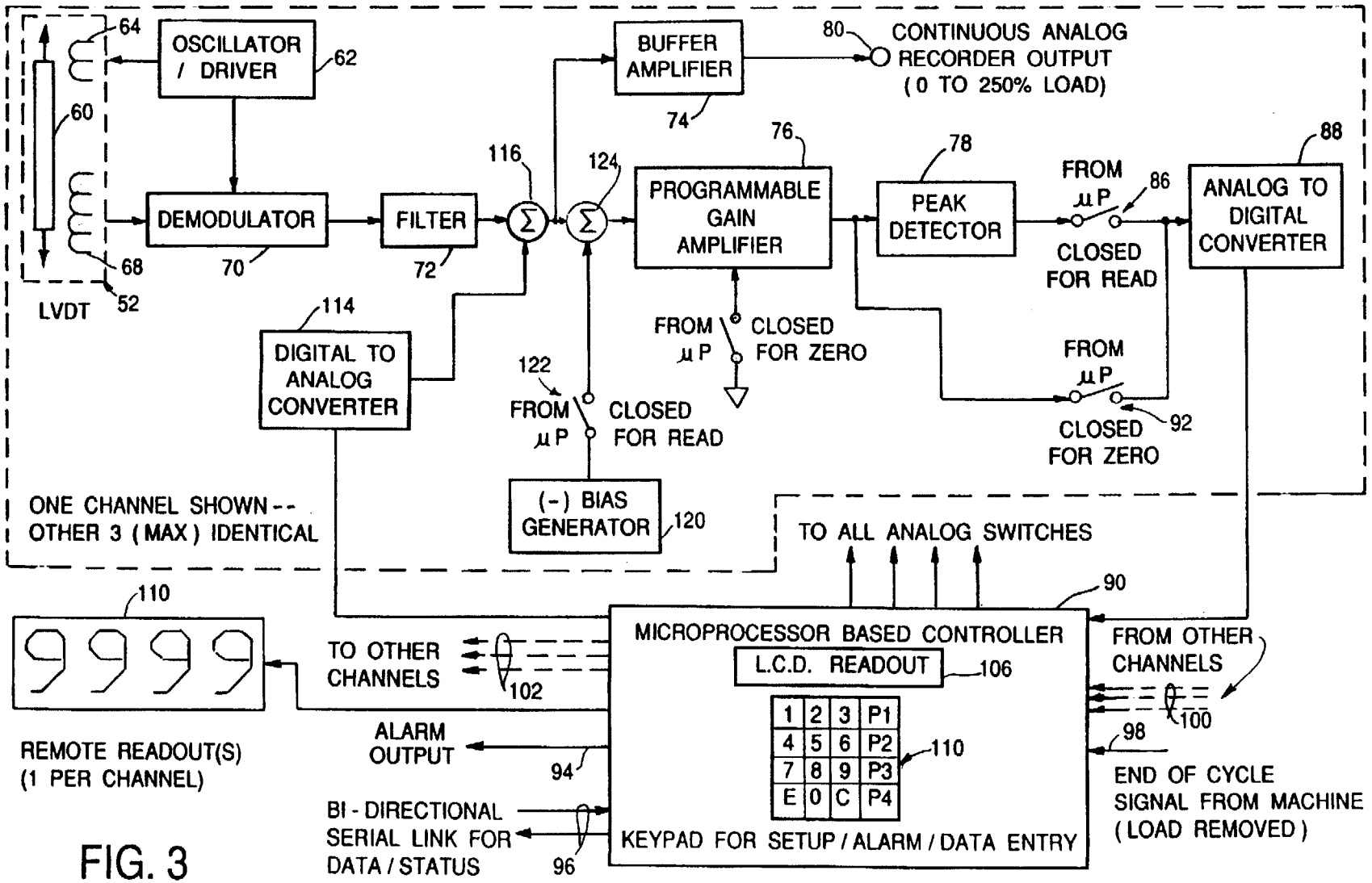
FIG. 3 illustrates a block diagram of the data acquisition/control unit as illustrated in FIG. 1.

Turning now to FIG. 3, a detailed description of the data acquisition/controller unit C is provided. It will be noted that the LVDT 52 includes a core 60 which is coaxially secured to the rod 26 (FIGS. 2A and 2B). An oscillator/driver 62 imparts a current to a coil 64, thereby inducing a magnetic flux therefrom. The core 60 is ferrous and disposed physically approximate to the coil 64. Accordingly, flux generated by application of current form the oscillator/driver 62 is affected by relative position of the core 60 thereto. A sensor coil 68 of the LVDT 52 acquires information as to properties of the flux, and provide a signal from voltages induced therefrom to a demodulator 70.

At this point, an analog signal from demodulator 70 is communicated to a filter 72. The signal is them communicated to a buffer/amplifier 74 and a programmable gain amplifier 76 through a summer pair to be described further below. The signal to the buffer/amplifier 74 is communicated to a continuous analog recorder output, such as a plotter at port 80. The signal from amplifier 76, which is an amplification from that of filter 72, is provided to a peaks detector 78.

A first switch 86 is closed to provide an output from peak detector 78 to an analog to digital (A/D) converter 88. The A/D converter 88 serves to digitize this signal for communication to a microprocessor base controller 90. The switch 86 is opened and a switch 92 is closed to short out the peak detector 78. Accordingly, the switch 92 allows for zeroing of the system to stable conditions. The digitized signal from A/D converter 88 is provided to the controller 90, operating under software as detailed below. The controller 90 also includes an alarm output 94, a port for bi-directional serial link 96, an end of cycle signal receiving port 98. Common controllers also include means 100 for receiving data from additional channels such as from a second LVDT, as well as means for communicating data to such additional channels. The system also employs a key pad for manual data entry, as well as a display as illustrated by LCD readout area 106. An external display 110 has also advantageously employed to provide an indication as to monitored press characteristics outside of the actual controller area.

A signal from controller 90 is communicated to a digital to analog ("D/A") converter 114 to a summer 116. The summer 116 sums the signal received from filter 72 to form a composite signal therewith. With this arrangement, it will be appreciated that a feedback loop is provided for enhancing stability and accuracy of the system as determined by the controller 90. Further, a bias voltage, generated from bias generator 120 is selectively applicable, via a switch 122 to a summer 120. This bias allows for additional controller and stabilizing of the signal from the filter 72 and for the purpose of maintaining an optimized signal range to peal detector 78. However, bias is not communicated directly to influence the buffer amplifier and, accordingly, the printout achieved from port 80.

Figure 4:
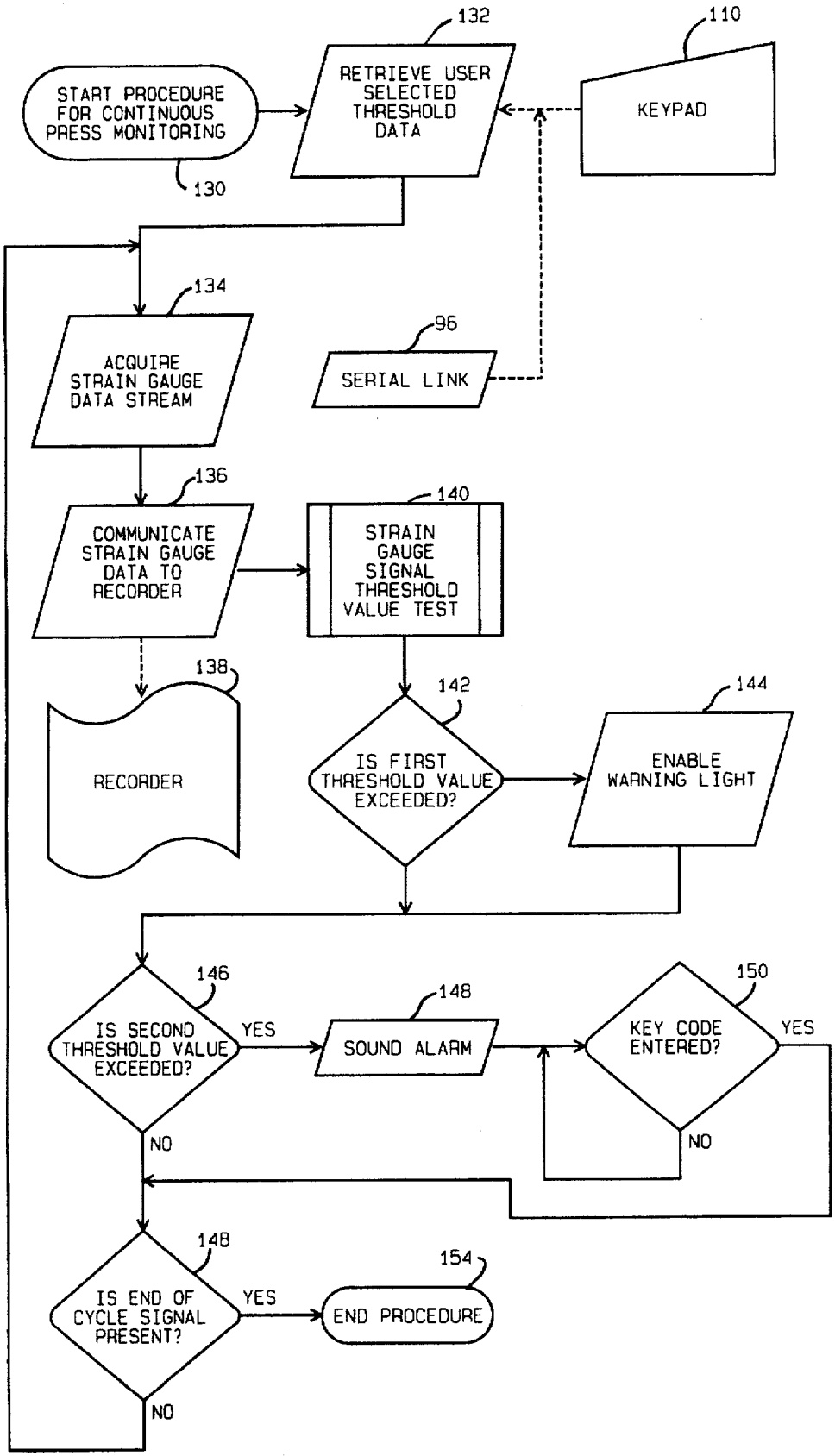
FIG. 4 provides a flow chart of the logical flow in connection with a press monitor/control system of FIGS. 1–3.

Turning now to FIG. 4, a flow chart of the instructions of the controller 90 is illustrated. The procedure for continuous monitoring is commenced at block 130. From this point, progress is made to block 132 which represents retrieval of data representative of a selected threshold. This data is advantageously user definable via user input from serial link port 96 or keypad 110.

Next, progress is made to block 134, at which point strain gauge data, obtained in accordance with an output of the LVDT 52 (FIG. 3), is achieved. At block 136, the strain gauge data is communicated to a recorder 138 which may be suitably formed of any non-volatile data storage mechanism such as a static memory.

Strain gauge data is then compared to first and second threshold data at block 140. At block 142, a determination is made as to whether the first threshold value is exceeded. A positive determination enables a warning light at block 144. At this point, or upon a negative determination at block 142, progress is made to block 146.

Next, a determination is made as to whether a second threshold value is exceeded at block 146. A positive determination results in the sounding of an alarm at block 148 by application of a signal from microprocessor based controller 90, via alarm output 94 (FIG. 3). This causes progress to block 150, at which state the system remains pending operation entry of a preselected code into keybed 110. Entry of such a code causes progress to block 152.

A negative determination in block 146 facilitates determination as to whether an end of cycle signal is present, as received from port 98 (FIG. 3). A positive determination from the end of cycle signal at block 152 directs an end of procedure at block 154. A negative determination at block 152 directs the system to proceed back to block 134, at which point additional strain gauge data is obtained from the current press cycle.

With the above-described structure, it will be appreciated that a means by which continuous, reliable press operation data is acquired and tested during a press operation. Undesirable press characteristics or flawed pieces may be determined throughout a production run. Such a contingency may result in the termination of a production procedure. Further, a historic record is provided on a procedure for closed-loop system monitoring and quality control. This data is obtainable via the bi-directional general serial link at 92 (FIG. 3).

Figure 5:
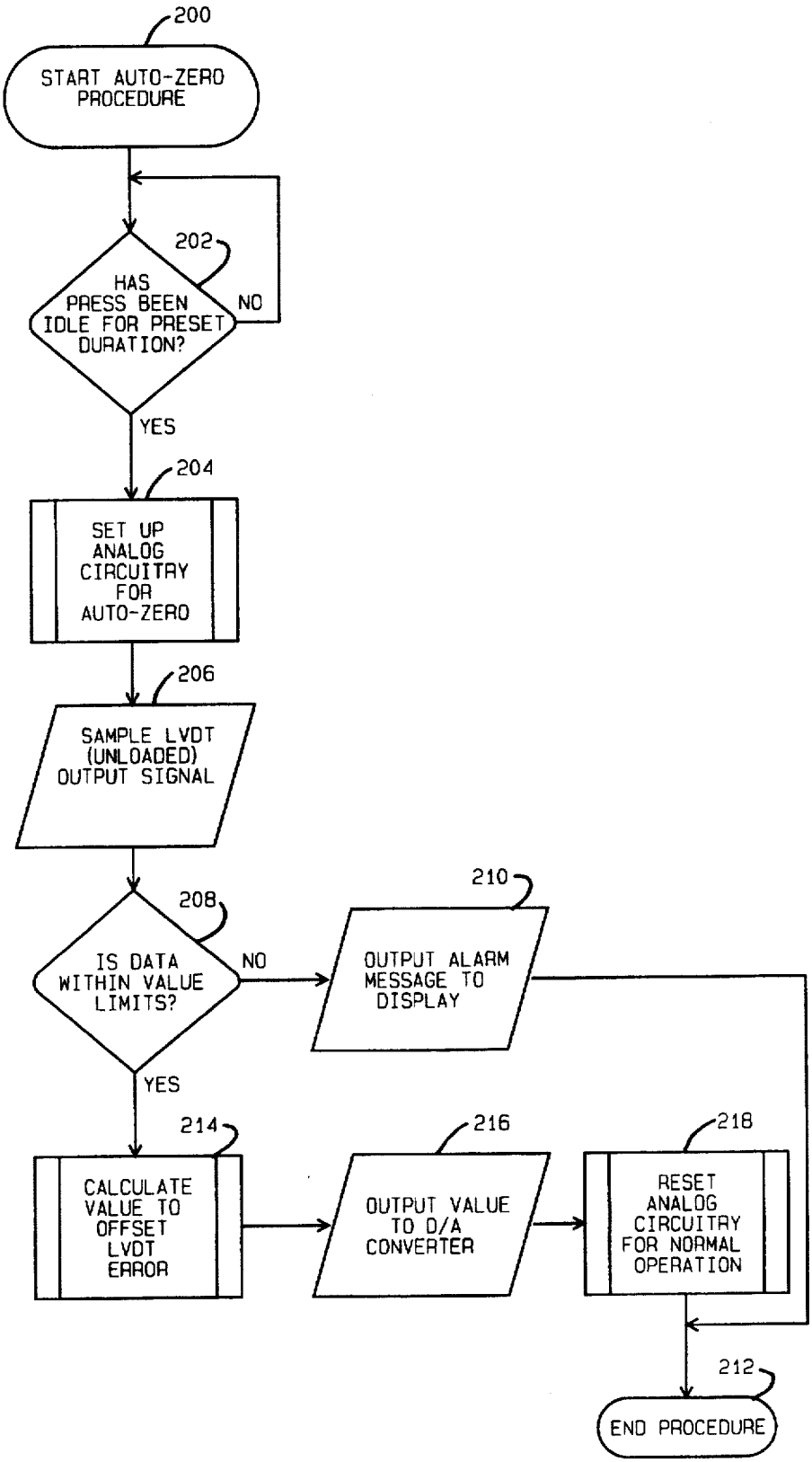
FIG. 5 provides a flow chart of an automatic zeroing function of the subject monitor/control system.

Referring now to FIG. 5, a procedural flow chart detailing operation of an automatic zeroing subsystem is illustrated. This function, referred to as "auto-zeroing" is executed when the monitor device, such as the press, is idle. If the device commences a load cycle, the function is immediately aborted without adjustment so that load cycle data integrity may be maintained The auto-zero procedure is commenced at block 200. Proceeding next to block 202, a determination is made as to whether the press had been idle for a preset duration. This preset duration is chosen to allow for settling of the structure. A negative determination at block 202 causes a "wait loop" by repeating the test. A positive result at block 202 causes progress to block 204, at which point analog circuitry is setup. The peak detector 78 and bias generator 120 are disabled and the programmable gain amplifier 76 is reconfigured at this point.

Next, at block 206, acquired data is compared to fixed (non-alterable) data. A determination is then made at to whether the mean value thereof is within preselected operational limits. A negative determination signifies an error condition which triggers an alarm at block 210 and an unconditional abort of the process at block 212. The alarm at block 210 includes the displaying of a message, on a liquid crystal display in the preferred embodiment, disclosing a nature of the malfunction to an operator. No further data is acquired from this channel in subsequent load cycles as it would be invalid.

A positive determination at block 208 causes progress to block 214. At this point, a digital value is calculated which will negate the data obtained in block 206. This value is then normalized and sent to the digital analog converter 114 in block 216.

From block 216, progress is made to block 218, at which point all analog circuitry for bias, gain, and peak detection are returned to their normal operating states. Control is then returned to the main monitoring routine outlined in FIG. 4, above at end procedure block 212.

The invention has been described with reference to the preferred embodiment. Obviously, modifications and alterations will occur to others upon the reading and understanding of this specification. It is intended that all such modifications and alterations be included insofar as they come within the scope of the appended claims or the equivalents thereof.

Having thus described the invention, it is now claimed:

1. A press operation data acquisition apparatus comprising:

a linear variable displacement transducer including a coil portion movably disposed relative to a core portion such that magnetic flux generated by current impressed on the coil portion is influenced by a position of the core portion relative thereto;

securing means adapted for securing the core portion to a first portion of a housing of an associated press and the coil portion to spaced apart portions of the housing of the associated press such that compression and expansion of the housing will influence a relative position of the core portion to the coil portion;

means for providing an electric current to the coil portion;

means continuously sensing the magnetic flux induced by operation of the associated press by monitoring of current in the coil portion;

position signal generating means for periodically generating a position signal representative of a relative position of the coil portion to the core portion in accordance with sensed magnetic flux; and calibrating means adapted for automatically calibrating the position signal to a base level prior to completing a press cycle of the associated press;

means for generating a press deflection signal in accordance with the position signal.

2. The press operation data acquisition device of claim 1 further comprising means for generating a display signal in accordance with the press deflection signal.

3. The press operation data acquisition device of claim 2 further comprising means for recording the press deflection signal.

4. The press operation data acquisition device of claim 3 wherein the means for recording the press deflection signal is comprised of at least one of a plotter, a printer and a data storage unit.

5. The press operation data acquisition device of claim 1 wherein the position signal generating means includes:

means for acquiring an analog signal representative of sense magnetic flux;

means for digitizing the analog signal; and means for filtering the digitized analog signal to form the position signal as digitized position signal.

6. The press operation data acquisition device of claim 5 further comprising:

comparator means for comparing the digitized analog signal to a comparison threshold value; and means for generating an alarm signal when the digitized analog signal exceeds the comparison threshold value.

7. The press operation data acquisition device of claim 6 further comprising:

means for acquiring data representative of a selected threshold value;

means for communicating the selected threshold value to the comparator means as the comparison threshold value.

8. The press operation data acquisition device of claim 7 further comprising means adapted for disabling an associated press in accordance with the alarm signal.

9. The press operation data acquisition device of claim 7 further comprising a container means for monitoring a minimum output from the monitored press during unloading thereof.

10. A press operation monitoring method comprising the steps of:

activating a press to perform a stamping operation;

monitoring deformation of a frame of the press relative to opposed first and second, spaced apart ends of a rod member, the first spaced apart end being mounted to the frame at a first mounting point so as to allow axial displacement of the rod corresponding to frame movement at the first mounting point, and the second spaced apart end being mounted to the frame at a second mounting point such that the rod axis is slidable relative to the second mounting point;

generating, via a linear variable displacement transducer secured to the second spaced apart end, a press deflection signal representative of the deformation induced by operation of the press;

automatically calibrating the press deflection signal to a base level prior to the step of activating; and generating a display signal in accordance with the press deflection signal.

11. The method of claim 10 further comprising the step of generating a tangible, historic record of the frame deformation in accordance with the press deflection signal.

12. The method of claim 11 further comprising the steps of:

comparing the press deflection signal to a comparison threshold value; and selectively generating an alarm signal in accordance with a result of the step of comparing.

13. The method of claim 12 further comprising the steps of:

digitizing the press deflection signal to form a digitized deflection signal;

filtering the digitized deflection signal to form a filtered digitized analog signal; and wherein the step of comparing includes the step of comparing the filtered digitized analog signal to the comparison threshold value formed as a digitized value.

14. A press operation data acquisition device comprising:

securing means adapted for securing a frame of the press relative to opposed first and second, spaced apart ends of a rod member, the first spaced apart end being mounted to the frame at a first mounting point so as to allow axial displacement of the rod corresponding to frame movement at the first mounting point, and the second spaced apart end being mounted to the frame at a second mounting point such that the rod axis is slidable relative to the second mounting point;

a linear variable displacement transducer including a coil portion secured to the frame at the second mounting, and a core portion secured to the rod at the second spaced part end such that a magnetic flux generated by application of current to the coil portion is affected by a relative position of the core portion thereto;

means for providing an electric current to the coil portion;

sensing means continuously sensing the magnetic flux during operation of the associated press by monitoring of current in the coil portion;

means for acquiring an analog flux level signal representative of sensed magnetic flux from the sensing means;

digitizing means for digitizing the flux level signal to form a digitized flux level signal;

filter means for filtering the digitized flux level signal to form a position signal;

calibrating means adapted for automatically calibrating the position signal to a base level prior to completing a press cycle of the associated press; and means for calculating a press deflection signal representative of a relative position of the coil portion to the core portion in accordance with the position signal.

15. The press operation data acquisition device of claim 14 further comprising means for generating an output signal representative of the press deflection signal.

16. The press operation data acquisition device of claim 15 further comprising:

means for storing a digital threshold value representative of at least one of an upper threshold level and a lower threshold level;

comparator means for comparing the press deflection signal to the digital threshold value; and means for generating a comparison signal in accordance with a comparison in the comparator means.

17. The press operation data acquisition device of claim 16 further comprising means for selectively generating an alarm signal when the comparison signal indicates that the press deflection signal surpasses the threshold level.

18. The press operation data acquisition device of claim 17 further comprising archiving means for archiving the output signal.

19. The press operation data acquisition device of claim 15 wherein the archiving means includes a plotter.

20. The press operation data acquisition device of claim 19 wherein the archiving means includes a non-volatile digital memory.

*21. A data acquisition apparatus for a metal forming machine, comprising:*

*a linear variable displacement transducer including a coil portion movably disposed relative to a core portion such that magnetic flux generated by current impressed on the coil portion is influenced by a position of the core portion relative thereto;*

*securing means adapted for securing the core portion to a first portion of a housing of an associated metal forming machine and the coil portion to spaced apart portions of the housing of the associated metal forming machine such that compression and expansion of the housing will influence a relative position of the core portion to the coil portion;*

*means for providing an electric current to the coil portion;*

*means continuously sensing the magnetic flux induced by operation of the associated metal forming machine by monitoring of current in the coil portion;*

*position signal generating means for periodically generating a position signal representative of a relative position of the coil portion to the core portion in accordance with sensed magnetic flux; and*

*calibrating means adapted for automatically calibrating the position signal to a base level prior to completing a cycle of the associated metal forming machine;*

*means for generating a deflection signal in accordance with the position signal.*

*22. The data acquisition device of claim 21 further comprising means for generating a display signal in accordance with the deflection signal.*

*23. The data acquisition device of claim 22 further comprising means for recording the deflection signal.*

*24. The data acquisition device of claim 23 wherein the means for recording the deflection signal is comprised of at least one of a plotter, a printer and a data storage unit.*

*25. The data acquisition device of claim 21 wherein the position signal generating means includes:*

*means for acquiring an analog signal representative of sensed magnetic flux;*

*means for digitizing the analog signal; and*

*means for filtering the digitized analog signal to form the position signal as digitized position signal.*

*26. The data acquisition device of claim 25 further comprising:*

*comparator means for comparing the digitized analog signal to a comparison threshold value; and*

*means for generating an alarm signal when the digitized analog signal exceeds the comparison threshold value.*

*27. The data acquisition device of claim 26 further comprising:*

*means for acquiring data representative of a selected threshold value;*

*means for communicating the selected threshold value to the comparator means as the comparison threshold value.*

*28. The data acquisition device of claim 27 further comprising means adapted for disabling an associated metal forming machine in accordance with the alarm signal.*

*29. The data acquisition device of claim 27 further comprising a container means for monitoring a minimum output from the monitored metal forming machine during unloading thereof.*

*30. A monitoring method for a metal forming machine comprising the steps of:*

*activating a metal forming machine to perform a metal forming operation;*

*monitoring deformation of a frame of the metal forming machine relative to opposed first and second spaced apart ends of a rod member, the first spaced apart end being mounted to the frame at a first mounting point so as to allow axial displacement of the rod corresponding to frame movement at the first mounting point, and the second spaced apart end being mounted to the frame at a second mounting point such that the rod axis is slidable relative to the second mounting point;*

*generating, via a linear variable displacement transducer secured to the second spaced apart end, a deflection signal representative of the deformation induced by operation of the metal forming machine;*

*automatically calibrating the deflection signal to a base level prior to the step of activating; and*

*generating a display sign in accordance with the deflection signal.*

*31. The method of claim 30 further comprising the step of generating a tangible, historic record of the frame deformation in accordance with the deflection signal.*

*32. The method of claim 31 further comprising the steps of:*

*comparing the deflection signal to a comparison threshold value; and*

*selectively generating an alarm signal in accordance with a result of the step of comparing.*

*33. The method of claim 32 further comprising the steps of:*

*digitizing the deflection signal to form a digitized deflection signal;*

*filtering the digitized deflection signal to form a filtered digitized analog signal; and wherein*

*the step of comparing includes the step of comparing the filtered digitized analog signal to the comparison threshold value formed as a digitized value.*

*34. A data acquisition device for a metal forming machine comprising:*

*securing means adapted for securing a frame of the metal forming machine relative to opposed first and second, spaced apart ends of a rod member, the first spaced apart end being mounted to the frame at a first mounting point so as to allow axial displacement of the rod corresponding to frame movement at the first mounting point, and the second spaced apart end being mounted to the frame at a second mounting point such that the rod axis is slidable relative to the second mounting point;*

*a linear variable displacement transducer including*

*a coil portion secured to the frame at the second mounting, and*

*a core portion secured to the rod at the second spaced part end such that a magnetic flux generated by application of current to the coil portion is affected by a relative position of the core portion thereto;*

*means for providing an electric current to the coil portion;*

*sensing means continuously sensing the magnetic flux during operation of the associated metal forming machine by monitoring of current in the coil portion;*

*means for acquiring an analog flux level signal representative of sensed magnetic flux from the sensing means;*

*digitizing means for digitizing the flux level signal to form a digitized flux level signal;*

*filter means for filtering the digitized flux level signal to form a position signal;*

*calibrating means adapted for automatically calibrating the position signal to a base level prior to completing a cycle of the associated metal forming machine; and*

*means for calculating a deflection signal representative of a relative position of the coil position of the coil portion to the core portion in accordance with the position signal.*

*35. The data acquisition device of claim 34 further comprising means for generating an output signal representative of the deflection signal.*

*36. The data acquisition device of claim 35 further comprising:*

*means for storing a digital threshold value representative of at least one of an upper threshold level and a lower threshold level;*

*comparator means for comparing the deflection signal to the digital threshold value; and*

*means for generating a comparison signal in accordance with a comparison in the comparator means.*

*37. The data acquisition device of claim 36 further comprising means for selectively generating an alarm signal when the comparison signal indicates that the deflection signal surpasses the threshold level.*

*38. The data acquisition device of claim 37 further comprising archiving means for archiving the output signal.*

*39. The data acquisition device of claim 35 wherein the archiving means includes a plotter.*

*40. The data acquisition device of claim 39 wherein the archiving means includes a non-volatile digital memory.*

* * * * *